US009798711B2

(12) United States Patent
Déjean

(10) Patent No.: US 9,798,711 B2
(45) Date of Patent: Oct. 24, 2017

(54) METHOD AND SYSTEM FOR GENERATING A GRAPHICAL ORGANIZATION OF A PAGE

(71) Applicant: Xerox Corporation, Norwalk, CT (US)

(72) Inventor: Hervé Déjean, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 168 days.

(21) Appl. No.: 14/955,410

(22) Filed: Dec. 1, 2015

(65) Prior Publication Data
US 2017/0154025 A1    Jun. 1, 2017

(51) Int. Cl.
    G06F 17/24     (2006.01)
    G06F 17/22     (2006.01)
    G06F 17/21     (2006.01)

(52) U.S. Cl.
    CPC ......... G06F 17/245 (2013.01); G06F 17/218 (2013.01); G06F 17/2241 (2013.01); G06F 17/2247 (2013.01); G06F 17/2288 (2013.01); G06F 17/241 (2013.01); G06F 17/248 (2013.01)

(58) Field of Classification Search
    CPC ............ G06F 17/218; G06F 17/2241; G06F 17/2247; G06F 17/2288; G06F 17/241; G06F 17/245; G06F 17/248
    See application file for complete search history.

(56) References Cited

U.S. PATENT DOCUMENTS

| 5,191,525 | A | * | 3/1993 | LeBrun | B07C 3/00 707/E17.009 |
| 5,245,674 | A | * | 9/1993 | Cass | G06K 9/32 382/181 |
| 5,253,305 | A | * | 10/1993 | Lin | G06K 9/00463 382/174 |
| 5,321,770 | A | * | 6/1994 | Huttenlocher | G06K 9/00463 382/174 |
| 5,592,574 | A | * | 1/1997 | Chilton | G06K 9/00463 382/295 |
| 5,666,490 | A | * | 9/1997 | Gillings | G06F 17/30265 705/301 |
| 5,784,487 | A | * | 7/1998 | Cooperman | G06K 9/00469 382/112 |
| 5,815,595 | A | * | 9/1998 | Gugler | G06K 9/2054 382/173 |

(Continued)

OTHER PUBLICATIONS

U.S. Appl. No. 13/911,452, filed Jun. 6, 2013, Hervé Déjean.

(Continued)

*Primary Examiner* — Kavita Padmanabhan
*Assistant Examiner* — Brian Garmon
(74) *Attorney, Agent, or Firm* — Fay Sharpe LLP

(57) ABSTRACT

This disclosure provides a method and system of generating a graphical organization of a document page. According to an exemplary embodiment, the method includes identifying grid-based structures represented by graphical lines of a document page. The exemplary method includes a sequence of steps where a rectangular zone associated with the page is analyzed by looking for lines that entirely cross the zone, either horizontally or vertically. A hierarchy of grid-based structures are then identified, which can be used for analysis of the document and/or data extraction.

17 Claims, 20 Drawing Sheets

(56) References Cited

U.S. PATENT DOCUMENTS

| | | | | |
|---|---|---|---|---|
| 5,848,184 | A | * | 12/1998 | Taylor ............... G06K 9/00463 382/173 |
| 6,006,240 | A | | 12/1999 | Handley |
| 7,668,372 | B2 | | 2/2010 | Schiehlen |
| 7,752,538 | B2 | | 7/2010 | Vion-Dury |
| 8,270,721 | B2 | | 9/2012 | Schiehlen |
| 2002/0178183 | A1 | | 11/2002 | Meding |
| 2005/0094206 | A1 | * | 5/2005 | Tonisson ............... G06F 17/248 358/1.18 |
| 2006/0271847 | A1 | * | 11/2006 | Meunier ............ G06K 9/00469 715/205 |
| 2006/0274938 | A1 | * | 12/2006 | Ortega ............... G06K 9/00469 382/173 |
| 2013/0321867 | A1 | | 12/2013 | Déjean |
| 2013/0343658 | A1 | | 12/2013 | Déjean |

OTHER PUBLICATIONS

U.S. Appl. No. 14/107,333, filed Dec. 16, 2013, Hervé Déjean et al.
U.S. Appl. No. 14/475,809, filed Sep. 3, 2014, Déjean et al.
Coüasnon, "DMOS, a generic document recognition method: application to table structure analysis in a general and in a specific way", Int J Doc Anal Recognit 8, pp. 111-122.
Coüasnon et al., "Recognition of Tables and Forms", Handbook of Document Image Processing and Recognition, Doermann and Tombre (Eds), Springer-Verlag, London, pp. 647- 667, 2014.
Embley et al., "Table-Processing Paradigms: A Research Survey", Int J Doc Anal Recognit 8, pp. 66-86, Jan. 2005.
Fang et al., "A Table Detection Method for Multipage PDF Documents Via Visual Separators and Tabular Structures", International Conference on Document Analysis and Recognition, ICDAR 2011.
Ramel et al., "Detection, Extraction and Representation of Tables", Seventh International Conference on Document Analysis and Recognition, 2003.
"Special Issue on Detection and Understanding of Tables and Forms for Document Processing Applications", International Journal of Document Analysis, Springer-Verlag 2006, published online Apr. 7, 2006.
Silva et al., "Design of an End-To-End Method to Extract Information From Tables", Int J Doc Anal Recognit 8, pp. 144-171.
Zanibbi et al., "A Survey of Table Recognition: Models, Observations, Transformations, and Inferences," Oct. 24, 2003.
Belaïd, Yolande and Belaïd, Abdel, article entitled "Morphological Tagging Approach in Document Analysis of Invoices", 17th International Conference on Pattern Recognition (ICPR'2004). (Cambridge, UK). IEEE, 2004. pp. 469-472.
Alberto Bartoli, Giorgio Davanzo, Eric Medvet, and Enrico Sorio, article entitled "Semisupervised Wrapper Choice and Generation for Print-Oriented Documents", Department of Engineering and Architecture (DIA), University of Trieste, Via Valerio 10, 34127 Trieste, Italy, IEEE Transactions on Knowledge and Data Engineering, vol. 26, No. 1, Jan. 2014, pp. 208-220.
Bill Janssen, Eric Saund, Eric Bier, Patricia Wall, and Mary Ann Sprague, article entitled "Receipts2go: The Big World of Small Documents", In Proceedings of the 2012 ACM symposium on Document Engineering (DocEng '12), Sep. 4-7, 2012, 4 pages.

* cited by examiner

| DESIGN AREA | HVAC DESIGN CRITERIA | | | | | | | | |
|---|---|---|---|---|---|---|---|---|---|
| | HVAC SYSTEM TYPE | SUMMER | | | | | WINTER | | |
| | | OUTSIDE | | INSIDE | | | OUTSIDE | INSIDE | |
| | | Db | Wb | Db | %RH | | Db | Wb | Db | %RH |
| CROCODILE NIGHT HOUSE | HEAT/VENTILATE | N/A | N/A | N/A | N/A | | 5 | N/A | 82-85 | N/A |
| FLAMINGO HOUSE | HEAT/VENTILATE | N/A | N/A | N/A | N/A | | 5 | N/A | 70-80 | N/A |
| HIPPO NIGHT HOUSE | HEAT/VENTILATE | N/A | N/A | N/A | N/A | | 5 | N/A | 70-80 | N/A |
| LIFE SUPPORT BLDG. | FAN COIL UNITS | 98 | 80 | 80 | 50-60 | | 5 | N/A | 60 | N/A |
| MANDRILL HOUSE | 100% OSA | 98 | 80 | 75 | 50 | | 5 | N/A | 72 | 35 |
| ROUND HOUSE | INDOOR AIR HANDLER | 98 | 80 | 75 | 50 | | 5 | N/A | 72 | 35 |

| | | | |
|---|---|---|---|
| FREIGHT INVOICE | | V0025599 | |
| | | INVOICE NO. | |

| BILL TO | BILL TO CODE | INVOICE DATE | INVOICE NO. |
|---|---|---|---|
| ATTN: ACCTS PAYABLE | 00164 | 06/24/2008 | V0025599 |
| | SHIP DATE | TRACTOR NO. | TRAILER NO. |
| LA MIRADA, CA 90638 | 06/19/2008 | | |

| BILL OF LADING NO. | BOOKING NO. | P.O. NO. | OTHER NO. | RELEASE NO. |
|---|---|---|---|---|
| 529993 | 9993 | | 0042037 | |

| SHIPPER | CONSIGNEE |
|---|---|
| CA | CA |

| DESCRIPTION | BILLING FACTOR | BILLING RATE | CHARGES |
|---|---|---|---|
| 101 - LINE HAUL | | 578.00 | 578.00 |

| COMMODITY | MILES | | |
|---|---|---|---|
| CORRUGATED | 385.00 RAND MCNALLY HHG | TOTAL CHARGES | $578.00 |
| BILLING NOTES | | PLEASE REMIT TO: | |
| | | CHINO, CA 91708 REGULATIONS REQUIRE PAYMENT WITHIN SEVEN (7) DAYS | |

FIG. 9A

FREIGHT INVOICE

V0025599
INVOICE NO.

BILL TO

ATTN: ACCTS PAYABLE

LA MIRADA, CA 90638

| BILL TO CODE | INVOICE DATE | INVOICE NO. |
|---|---|---|
| 00164 | 06/24/2008 | V0025599 |
| SHIP DATE | TRACTOR NO. | TRAILER NO. |
| 06/19/2008 | | |

| BILL OF LADING NO. | BOOKING NO. | P.O. NO. | OTHER NO. | RELEASE NO. |
|---|---|---|---|---|
| 529993 | 9993 | | 0044X037 | |

| SHIPPER | CONSIGNEE |
|---|---|
| CA | CA |

| DESCRIPTION | BILLING FACTOR | BILLING RATE | CHARGES |
|---|---|---|---|
| 101 - LINE HAUL | | 578.00 | 578.00 |

| COMMODITY | MILES | TOTAL CHARGES | $578.00 |
|---|---|---|---|
| CORRUGATED | 385.00 RAND MCNALLY HHG | | |
| BILLING NOTES | | PLEASE REMIT TO: | |
| | | CHINO, CA 91710 REGULATIONS REQUIRE PAYMENT WITHIN SEVEN (7) DAYS | |

| COMMODITY | MILES | TOTAL CHARGES | |
|---|---|---|---|
| CORRUGATED | 365.00 RAND MCNALLY HHG | | $570.00 |
| BILLING NOTES 916 | | PLEASE REMIT TO: ▓▓▓▓ ▓▓▓ CHINO, CA 91710 ▓▓▓ REGULATIONS REQUIRE PAYMENT WITHIN SEVEN (7) DAYS | |

ROW 1 / ROW 2

FIG. 9F

| COLUMN 1 | COLUMN 2 | COLUMN 3 |
|---|---|---|
| COMMODITY | LBS | TOTAL CHARGES $573.00 |
| CORRUGATED | 365.00 RAND MCNALLY HHG | |
| BILLING NOTES | | PLEASE REMIT TO: ▬▬▬▬▬ ▬▬▬ CHINO, CA 91710 REGULATIONS REQUIRE PAYMENT WITHIN SEVEN (7) DAYS |

914 (Total Charges), 912 (Billing Notes area)

FIG. 9G

| COMMODITY | MILES | | TOTAL CHARGES | $579.00 |
|---|---|---|---|---|
| CORRUGATED | 385.00 RAND MCNALLY HHG | | | |
| BILLING NOTES | | | PLEASE REMIT TO: ████████ ████ CHINO, CA 91710 ████████ REGULATIONS REQUIRE PAYMENT WITHIN SEVEN (7) DAYS | |

3RD LARGEST SUBZONE

FIG. 9J

METHOD AND SYSTEM FOR GENERATING A GRAPHICAL ORGANIZATION OF A PAGE

CROSS REFERENCE TO RELATED PATENTS AND APPLICATIONS

U.S. patent application Ser. No. 14/475,809, filed Sep. 3, 2014, by Hervé Déjean et al., entitled "METHOD AND SYSTEM OF EXTRACTING LABEL:VALUE DATA FROM A DOCUMENT";

U.S. patent application Ser. No. 13/484,708, filed May 31, 2012, Publication No. 2013/0321867, published Dec. 5, 2013, by Hervé Déjean, entitled "TYPOGRAPHICAL BLOCK GENERATION";

U.S. patent application Ser. No. 13/530,141, filed Jun. 22, 2012, Publication No. 2013/0343658, published Dec. 26, 2013, by Hervé Déjean, entitled "SYSTEM AND METHOD FOR IDENTIFYING REGULAR GEOMETRIC STRUCTURES IN DOCUMENT PAGES";

U.S. patent application Ser. No. 13/911,452, filed Jun. 6, 2013, by Hervé Déjean; entitled "METHODS AND SYSTEMS FOR GENERATION OF DOCUMENT STRUCTURES BASED ON SEQUENTIAL CONSTRAINTS";

U.S. patent application Ser. No. 13/943,263, filed Jul. 16, 2013, by Hervé Déjean, and entitled "PAGE FRAME AND PAGE COORDINATE DETERMINATION METHOD AND SYSTEM BASED ON SEQUENTIAL REGULARITIES"; and U.S. patent application Ser. No. 14/107,333, filed Dec. 16, 2013, by Hervé Déjean et al., and entitled "METHOD AND SYSTEM OF EXTRACTING STRUCTURED DATA FROM A DOCUMENT", are incorporated herein by reference in their entirety.

BACKGROUND

The exemplary embodiments disclosed herein relate to document processing and find particular application in connection with a method and system for generating a graphical organization of a scanned document page, which can then be used for extracting data from the scanned document page.

While the use of electronically created and recorded documents is prevalent, many such electronic documents are in a form that does not permit them to be used other than for viewing or printing. To provide greater accessibility to the content of such documents, it is desirable to understand their structure. However, when electronic documents are recovered by scanning a hardcopy representation or by recovering an electronic representation, e.g., PDF (Portable Document Format) or Postscript representation, a loss of document structure usually results because the representation of the document is either at a very low level, e.g., bitmap, or an intermediate level, e.g., a document formatted in a page description language or a portable document format.

Geometric or physical page layout analysis can be used to recognize the different elements of a page, often in terms of text regions and image regions. Methods are known for determining a document's logical structure, or the order in which objects are laid out on a document image, i.e., layout objects. Such methods exploit the geometric or typographical features of document image objects, sometimes using of the content of objects and a priori knowledge of page layout for a particular document class. Geometric page layout analysis (GPLA) algorithms have been developed to recognize different elements of a page, often in terms of text blocks and image blocks. Examples of such algorithms include the X-Y Cut algorithm, described by Nagy et al., "A PROTOTYPE DOCUMENT IMAGE ANALYSIS SYSTEM FOR TECHNICAL JOURNALS", CSE Journal Article, Department of Computer Science and Engineering, pages 10-22, July, 1992 and the Smearing algorithm, described by Wong et al., "Document analysis system", IBM Journal of Research and Development, volume 26, No. 6, pages 647-656, November, 1982. These GPLA algorithms receive as input a page image and perform a segmentation based on information, such as pixel information, gathered from the page. These approaches to element recognition are either top-down or bottom-up and mainly aim to delimit boxes of text or images in a page. These methods are useful for segmenting pages one dimensionally, into columns.

In addition, as disclosed in U.S. patent application Ser. No. 13/911,452, filed Jun. 6, 2013, by Hervé Déjean; entitled "METHODS AND SYSTEMS FOR GENERATION OF DOCUMENT STRUCTURES BASED ON SEQUENTIAL CONSTRAINTS", a method and system is provided that structures a sequentially-ordered set of elements, each being characterized by a set of features. N-grams, i.e., a sequence of n features, are computed from a set for n contiguous elements, and n-grams which are repetitive, e.g., Kleene cross, are selected. Elements matching the most frequent repetitive n-gram are grouped together under a new node, and a new sequence is created. The method is iteratively applied to this new sequence. The output is an ordered set of trees.

A common task in document analysis is extracting data from an unstructured document, sometimes referred to as indexing. The extracted data can correspond to a single piece of text, such as an invoice number, or to structured data including several fields, such as an invoice item having a description, price per unit, total amount, etc. For purposes of this disclosure, this structured data is referred to as sdata (structured data).

A primary issue in extracting structured data is the lack of correspondence between the sdata/data fields and the way their layout is performed, except for documents which mostly follow a layout template such as forms. In some documents, one homogeneous block can contain all the data fields. In another document, each field may be spread over table cells. No generic algorithm can systematically provide segmentation where found layout elements correspond to a single sdata. An analysis combining layout information and content information is then required to identify complete sdata.

This disclosure provides a method and system to generate a graphical organization of a page which can then be further processed to extract data or perform other processing to extract information from the generated graphical organization descriptions.

INCORPORATION BY REFERENCE

U.S. patent application Ser. No. 14/475,809, filed Sep. 3, 2014, by Hervé Déjean et al., "METHOD AND SYSTEM OF EXTRACTING LABEL VALUE DATA FROM A DOCUMENT";

U.S. Patent Publication No. 2002/0178183, published Nov. 28, 2002, by Medina, entitled "DATA EXTRACTION METHOD AND APPARATUS";

U.S. Pat. No. 6,006,240, issued Dec. 21, 1999, by Handley, entitled "CELL IDENTIFICATION IN TABLE ANALYSIS";

U.S. Pat. No. 7,752,538, issued Jul. 6, 2010, by Vion-Dury, entitled "GRAPHICAL SYNTAX ANALYSIS OF TABLES THROUGH TREE REWRITING";

U.S. Pat. No. 7,668,372, issued Feb. 23, 2010, by Matthias Schiehlen, and entitled "METHOD AND SYSTEM FOR COLLECTING DATA FROM A PLURALITY OF MACHINE READABLE DOCUMENTS";

U.S. Pat. No. 8,270,721, issued Sep. 18, 2012, by Jean-Yves Vion-Dury, and entitled "METHOD AND SYSTEM FOR ACQUIRING DATA FROM MACHINE-READABLE DOCUMENTS";

Belaïd, Yolande and Belaïd, Abdel, article entitled "Morphological Tagging Approach in Document Analysis of Invoices", 17th International Conference on Pattern Recognition (ICPR'2004). (Cambridge, UK). IEEE, 2004. pages 469-472;

Alberto Bartoli, Giorgio Davanzo, Eric Medvet, and Enrico Sorio, article entitled "Semisupervised Wrapper Choice and Generation for Print-Oriented Documents", Department of Engineering and Architecture (DIA), University of Trieste, Via Valerio 10, 34127 Trieste, Italy, IEEE Transactions on Knowledge and Data Engineering, Vol. 26, No. 1, January 2014, pages 208-220;

Bill Janssen, Eric Saund, Eric Bier, Patricia Wall, and Mary Ann Sprague, article entitled "Receipts2go: The Big World of Small Documents", In Proceedings of the 2012 ACM symposium on Document Engineering (DocEng '12), Sep. 4-7, 2012, 4 pages;

Ramel et al., "DETECTION, EXTRACTION AND REPRESENTATION OF TABLES", Seventh International Conference on Document Analysis and Recognition, 2003;

Fang et al., "A TABLE DETECTION METHOD FOR MULTIPAGE PDF DOCUMENTS VIA VISUAL SEPARATORS AND TABULAR STRUCTURES", International Conference on Document Analysis and Recognition, ICDAR 2011;

Coüasnon et al., "RECOGNITION OF TABLES AND FORMS", Handbook of Document Image Processing and Recognition, Doermann and Tombre (Eds), Springer-Verlag, London, pages 647-667, 2014;

"SPECIAL ISSUE ON DETECTION AND UNDERSTANDING OF TABLES AND FORMS FOR DOCUMENT PROCESSING APPLICATIONS", International Journal of Document Analysis, Springer-Verlag 2006, published online Apr. 7, 2006;

Embley et al., "TABLE-PROCESSING PARADIGMS: A RESEARCH SURVEY", Int J Doc Anal Recognit 8, pages 66-86, January 2005;

Silva et al., "DESIGN OF AN END-TO-END METHOD TO EXTRACT INFORMATION FROM TABLES", Int J Doc Anal Recognit 8, pages 144-171;

Coüasnon, "DMOS, a generic document recognition method: application to table structure analysis in a general and in a specific way", Int J Doc Anal Recognit 8, pages 111-122; and Zanibbi et al., "A SURVEY OF TABLE RECOGNITION: MODELS, OBSERVATIONS, TRANSFORMATIONS, AND INFERENCES," Oct. 24, 2003, are incorporated herein by reference in their entirety.

BRIEF DESCRIPTION

In one embodiment of this disclosure, described is a method of generating a graphical organization of a digital version of a document page using a document processing system including a memory and a processor communicatively coupled to the memory for performing the method, the method comprising: a) the processor extracting a description of the digital version of the document page, the description including a length of the document page, a width of the document page, and one or more graphical line descriptions, the graphical line descriptions associated with a position and length of one or more graphical lines present in the document page; b) the processor generating an initial zone to cover a predetermined first area of the document page which is equal to or less than a total area of the page, the predetermined first area including an initial zone length and initial zone width; c) the processor determining if one or more dimensional graphical lines are within the initial zone, where the dimensional graphical lines are defined as graphical lines present in the initial zone where the graphical line length is substantially equivalent to the initial zone length or width; d) if the initial zone includes one or more dimensional graphical lines, the processor generating one or more grid-tables including the one or more dimensional graphical lines providing horizontal and/or vertical boundaries associated with cells of the generated grid-tables; and e) if the initial zone does not include one or more dimensional graphic lines, e1) the processor generating one or more subzones to cover an area within the initial zone, each subzone area including a subzone length and subzone width; e2) the processor determining if one or more subzone dimensional graphic lines are present within each subzone, where the subzone dimensional graphic lines are defined as graphic lines with line lengths substantially equivalent to the subzone length or width; e3) if the subzone includes one or more subzone dimensional graphic lines, the processor generating one or more subzone grid-tables including the one or more subzone dimensional graphic lines providing horizontal and/or vertical boundaries associated with cells of the generated subzone grid-tables; f) the processor generating attributes associated with the document page, the attributes including a list of generated zone descriptions and a list of respective grid-table descriptions.

In another embodiment of this disclosure, described is a document processing system for generating a graphical organization of a digital version of a document page, the document processing system comprising: an extraction module configured to extract a description of the digital version of the document page, the description including a length of the document page, a width of the document page, and one or more graphical line descriptions, the graphical line descriptions associated with a position and length of one or more graphical lines present in the document page; an initial zone generation module configured to generate an initial zone to cover a predetermined first area of the document page which is equal to or less than a total area of the page, the predetermined first area including an initial zone length and initial zone width; a dimensional graphical line determination module configured to determine if one or more dimensional graphical lines are within the initial zone, where the dimensional graphical lines are defined as graphical lines present in the initial zone where the graphical line length is substantially equivalent to the initial zone length or width; a grid-table generation module configured to generate one or more grid-tables if the initial zone includes one or more dimensional graphical lines, the one or more grid-tables including the one or more dimensional graphical lines providing horizontal and/or vertical boundaries associated with cells of the generated grid-tables; a subzone generation module configured to generate one or more subzones if the initial zone does not include one or more dimensional lines by generating one or more subzones to cover an area within the initial zone, each subzone area including a subzone length and subzone width; a subzone dimensional graphic line determination module configured to determine if one or more subzone dimensional graphic lines are present within each subzone, where the subzone dimensional graphic lines are defined as graphic lines with line lengths substantially equivalent to the subzone length or width; a subzone grid-table generation module configured to generate one or more subzone grid-tables if the subzone includes one or more subzone dimensional graphic lines, the subzone grid-tables including the one or more subzone dimensional graphic lines providing horizontal and/or vertical boundaries associated with cells of the generated subzone grid-tables; and an attribute generation module configured to generate attributes associated with the document page, the attributes including a list of generated zone descriptions and a list of respective grid-table descriptions.

In still another embodiment of this disclosure, described is a method of extracting structural table and value pairwise data associated with a digital version of a document using a document processing system including a memory and a processor communicatively coupled to the memory for performing the method, the method comprising; a) the processor performing a layout analysis of the digital version of the document to generate one or more layout structures associated with the document, each layout structure including a list of generated zone descriptions and a list of respective grid-table descriptions associated with one or more page of the document, and each layout structure including a plurality of structural elements vertically or horizontally aligned within a zone where each structural element is defined as including one or more lines of textual elements; b) processing the one or more lines of textual elements to identify and tag textual elements associated with label and value pairwise data; c) processing the one or more layout structures and associated tagged textual elements to generate one or more respective label:value sequences of tagged textual elements representative of a respective layout structure; and d) extracting label and value pairwise data from the one or more label:value sequences of tagged elements.

BRIEF DESCRIPTION OF THE DRAWINGS

FIG. 1 is an example of a full grid-table segmentation including column-spanned cells and row-spanned cells.

FIG. 3 is an example of a scanned invoice, where an exemplary method of generating a graphical organization identifies four non-overlapping grid tables, where no full grid-table is identified and no segmentation is identified for a bottom-right cell in the last row.

FIG. 4 is an example of non-compatible column organization as described herein.

FIG. 6A is an example of a document page including a dataset, where the dotted lines indicate a manually annotated table detection and the solid lines indicate table detection using an exemplary method of generating a graphical organization.

FIG. 6B is an example of a document page including a dataset, where the dotted lines indicate a manually annotated table detection and the solid lines indicate table detection using an exemplary method of generating a graphical organization.

FIGS. 9A-9K illustrate an example of a series of steps included in an exemplary method of generating a graphical organization of a scanned invoice.

FIG. 9A illustrates an initial scan of an invoice to be processed.

FIG. 9B identifies an initial zone including the entire page.

FIG. 9C illustrates where no dimensional elements are found for the initial zone and step 6 of the exemplary method creates five sub-zones.

FIG. 9D illustrates the exemplary method of generating a graphical organization of a page for Zone A, where the method identifies two vertical and three horizontal dimensional elements within Zone A and identifies a single grid table.

FIG. 9E illustrates the exemplary method of generating a graphical organization of a page for Zone E, where the method identifies two vertical and one horizontal dimensional element.

FIG. 9F illustrates the exemplary method of generating a graphical organization of a page for Zone E, where two rows are generated using the one identified horizontal dimensional element.

FIG. 9G illustrates the exemplary method of generating a graphical organization of a page for Zone E, where three columns are generated using the two identified vertical dimensional element.

FIGS. 9H, 9I and 9J illustrate the exemplary method of generating a graphical organization of a page for Zone E, where the method generates three subzones and sorts them by size, FIG. 9H identifying the largest subzone, FIG. 9I identifying the second largest subzone, and FIG. 9J identifying the third largest subzone.

FIG. 9K illustrates the exemplary method of generating a graphical organization of a page for Zone E, where two cells in the right-most column are tagged as row-spanned, indicated by dashed lines.

DETAILED DESCRIPTION

Figure 2:
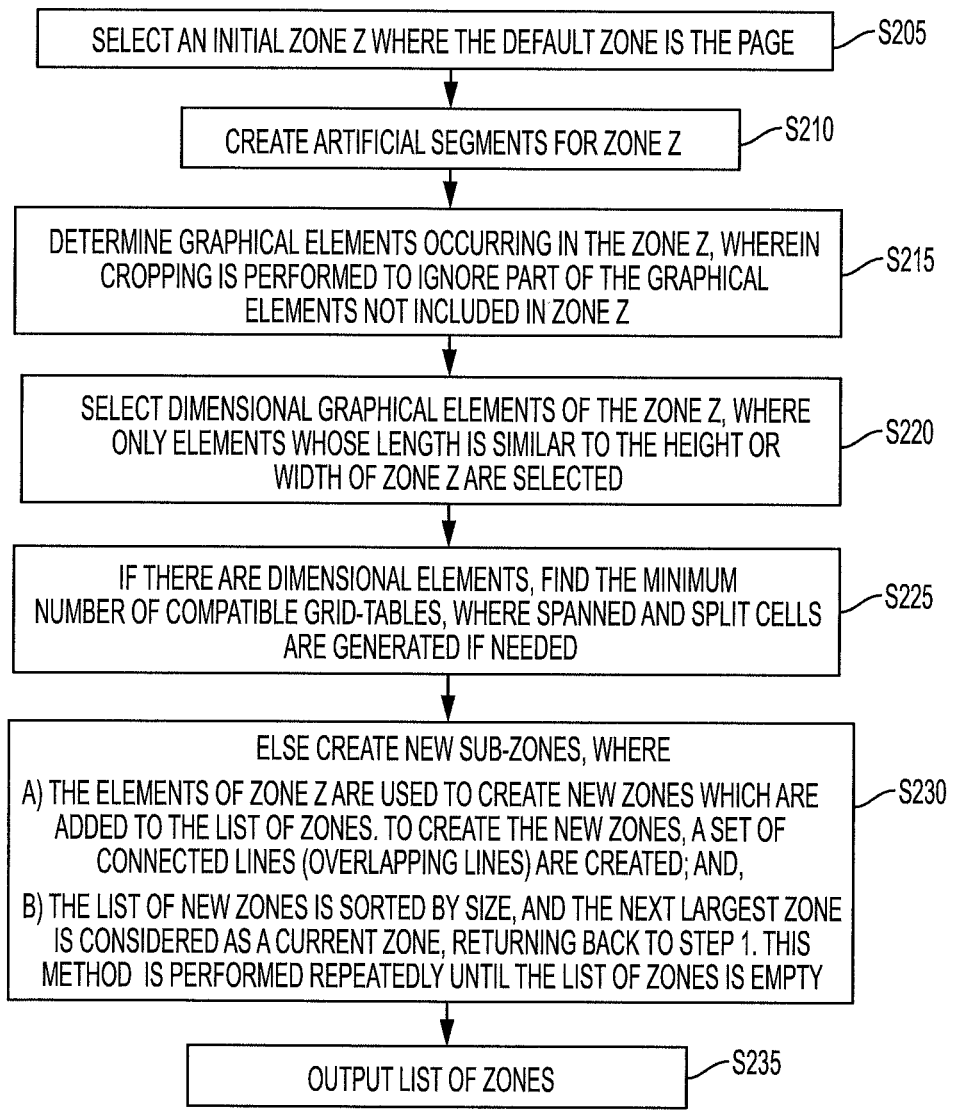
FIG. 2 is a flow chart of a method of generating a graphical organization of a digital version of a document page according to an exemplary embodiment of this disclosure.

This disclosure provides a document processing method and system for discovering document grid-based structures materialized by graphical lines, i.e., segments, included on a page of a document. The method and system assumes the availability of the graphical lines, either by the document format provided or by discovering the graphical lines using a specialized process. The method and system includes a sequence of steps where rectangular zones, either the page itself or bounding boxes associated with each set of connected lines, are analyzed to determine lines that cross the zone entirely, either horizontally or vertically. A hierarchy of grid-based structures is then identified, including possible alternative or overlapping grid-based structures. The identified structures are used for understanding the document layout and/or data extraction tasks.

The method and system described herein generates a representation of a graphical organization associated with a document page. The zone organization generated is uniquely built through graphical segments, also referred to as lines. In order to segment a zone with graphical segments, the method and system assumes that the length of the graphical segments associated with the zone's segmentation is substantially equal to the height or width dimension of the zone. The algorithm uses a top-down approach, starting from an initial zone, usually a rectangle including the entire page, segmenting the initial zone into new rectangular sub-zones, and recursively applying segmentation to the newly created zones and tables. In the case of borderline situations, different alternatives are generated. The overall context of the disclosed method and system to generate the zone organization of a document page is data extraction from the document page.

The assumption that the size of the graphical segments involved in its segmentation is equal to one of the dimensions of the zone (height or width) makes the algorithm very simple, with one parameter, and does not over-generate much.

The disclosed method and system generates alternative solutions for difficult cases. Additionally, while other methods focus on table direction, the focus here is on determining any graphical zone. In a sense, the reformulation of the problem allows the use of a relatively simple method to solve it. Noise, mainly broken or missed lines, is also taken into account by the method and system described herein.

The method and system described herein generates an output including descriptions of recursive graphical zones associated with the page. Whenever possible, these zones are described as a grid-table, i.e., a table fully segmented into rows and columns, potentially requiring span cells.

According to an exemplary embodiment, the method is used in two types of documents: invoices and architectural plans, including further processing of the zones to perform data extraction.

Graphical lines are commonly used in order to delimit zones in a page. A basic example is the delimitation of tables (full or partial, where there are: only rows or columns), content boxes in magazines, (graphical) column rulers such as in newspapers. These graphical lines are used by many other methods in order to segment zones, especially for tables, but their current use is dedicated to a specific context. Specifically, they are used with an object in mind, i.e., table detection. Commercial OCR (Optical Character Recognition) engines are very conservative, and do not offer other elements than lines or full tables.

The method and system to operate a graphical organization of a page disclosed herein, considers the whole page and organizes it into zones based on the presence of graphical lines, where no specific objects, such as a table, are specifically targeted by the method itself.

The method is relatively simple and efficient, relying on the simple assumption that the dimension of the graphical lines is in relation with the dimensions of the zone to be segmented: its height or its width. Fundamentally, the segmentation of a zone into sub-zones requires drawing one or several lines to completely segment the zone horizontally and/or vertically. The method and system described herein simply uses this property in order to segment a zone and to delimitate a zone. The disclosed method and system, i.e., pure top-bottom method, uses recognizing rows and columns before cells.

As a result, the method and system provides a hierarchical segmentation of an initial zone. It is important to highlight that the method does not type, i.e., tag, any resulting zones as table, rulers, etc., even if some typical structures can be easily recognized, such as a full grid-table. The interpretation of the identified structures strongly depends on the document type, which range from novels to blueprints. But nevertheless, the method and system provides for detecting potentially interesting graphical structures for many types of documents.

A grid-table model provides for the representation of a table as a regular grid. Cells can be merged or split in order to fit the grid. Using col-span and row-span information, different cell orders can be generated. The exploitation of the table is data-dependent and is performed by a data-extraction component. In other words, to understand a table it must be known what type of data is included in the table.

The grid-table model is used by many other methods to model tables. See Ramel et al., "DETECTION, EXTRACTION AND REPRESENTATION OF TABLES", Seventh International Conference on Document Analysis and Recognition, 2003. A notable feature of the method and system described herein is the generation of potentially concurrent grid-tables for an identical zone if no clear comprehensive grid-table is detected. FIG. 1 is an example of a full grid-table segmentation including column-spanned cells and row-spanned cells.

Input: As soon as graphical lines are detected in a document page, the method is applied. The method was tested on two types of document formats: images and PDF. For image document formats, a line detection step is performed using basic known algorithms. For PDF formats, graphical instructions are extracted, decomposed into segments, and vertical and horizontal segments are extracted where clipping is also taken into consideration. Both formats provide:

The page dimensions (height, width);

A list of lines defined by their position in the page (x-start, y-start), their type (horizontal or vertical) and a representation of their length.

FIG. 2 is a flow chart of a method of generating a graphical organization of a digital version of a document page according to an exemplary embodiment of this disclosure.

The steps of the method are as follows:

1—At step S205, select an initial zone z where the default zone is the page;

2—At step S210, create artificial segments for the zone z;

3—At step S215, determine graphical elements occurring in the zone z, where cropping is performed to ignore part of the graphical elements not included in zone z;

4—At step S220, select dimensional graphical elements of the zone z, where only elements whose length is similar to the height or width of zone z are selected, hereafter referred to as dimensional. A threshold is used to compute the similarity, where length>TH*H or length>TH*W;

5—At step S225, if there are dimensional elements, find the minimum number of compatible grid-tables, where spanned and split cells are generated if needed. Overlapping between grid-tables is permitted.

With difficult cases,

6—At step S230, else create new sub-zones, where
  a) the elements of zone z are used to create new zones which are added to the list of zones. To create the new zones, a set of connected lines (overlapping lines) are created; and
  b) the list of new zones is sorted by size, and the next largest zone is considered as a current zone, returning back to step 1. This method is performed repeatedly until the list of zones is empty.

At step S235, the output generated includes a list of zones. Each zone is described by its organization, i.e., a list of one or more grid-tables. The simplest case is a grid table including only one row and one column, hence one cell.

Explained in more detail below is Step 5 (S225), which is the core step of the method.

Input: a zone z, a set of dimensional lines, and a set of (non-dimensional) lines.

Importantly, a line is considered as dimensional if its length corresponds to one of the dimensions of the current zone, i.e., width or height. An approximation is used to compare line length and zone dimensions which is a primary parameter of the method.

The presence of dimensional lines allows the segmentation of the zone into rows and/or columns.

a) If both vertical and horizontal dimensional lines, a unique grid-table is created for the zone, where rows and columns are first generated, then cells are generated. The new cells are added to the list of zones, and are considered new zones for the next iterations.

b) If only one type of dimensional line is found, i.e., only rows or only columns, sub-zones are created using the found dimension lines, including the following steps:
  i. The comprehensive list of zones made by n contiguous rows or columns;
  ii. Sub-zones are sorted by size, the largest first;
  iii. If dimensional lines are found for this zone, a grid-table is generated and incrementally extended to adjacent rows or columns, as long as the added row or column segmentation is coherent with the grid. Several grid-tables can be generated, and may overlap each other.

For both steps a) and b), spanned cells and split cells may be generated due to some missing or added lines in a specific zone.

Figure 3:
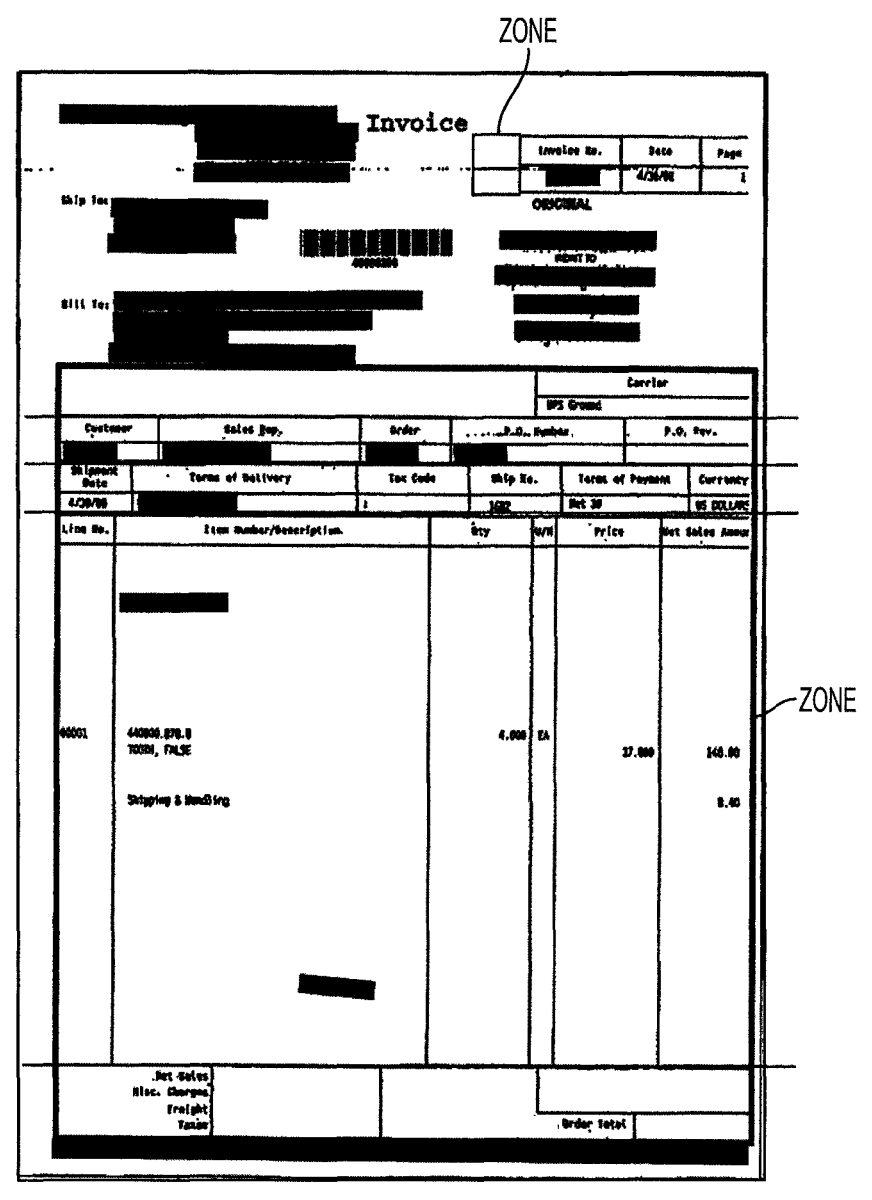
Figure 4:
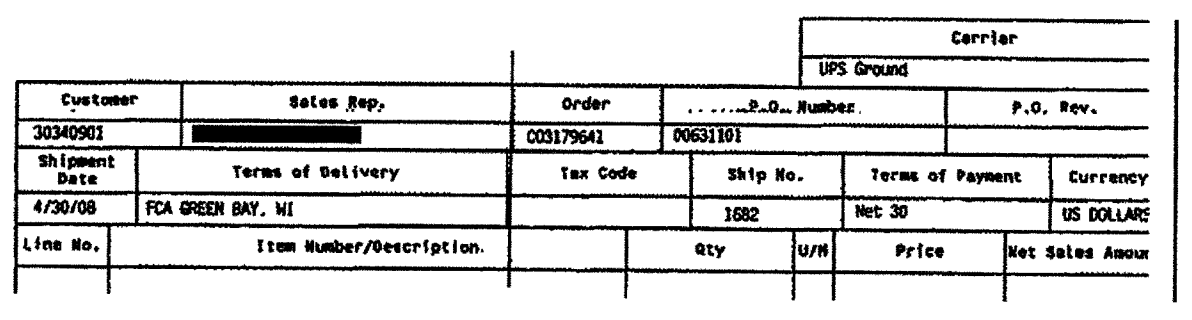

See FIG. 3 and FIG. 4 which illustrate this step. Specifically, FIG. 3 is an example of a scanned invoice, where an exemplary method of generating a graphical organization identifies four non-overlapping grid tables, where no full grid-table is identified and no segmentation is identified for a bottom-right cell in the last row and FIG. 4 is an example of non-compatible column organization as described herein.

FIG. 3 shows two zones, a relatively small zone on the top-right portion of the document page, and a relatively large zone in the middle of the document page. The small zone includes a 'normal' table, but due to some noise, an additional, first column is added. Notably, a tested commercial OCR algorithm makes the same mistake. The large zone is decomposed into several non-overlapping grid-tables. FIG. 4 shows the column non-compatible column organization. As usual when comparing, some approximation is required. The vertical line points out a case where the two vertical segments can be considered as identical. A threshold of 3 points (approximately 1 millimeter) is used here; however, a threshold of 5 points, up to 10 points, does not impact the quality. To be considered as identical, two rows must share the same set of column separator. To be considered as identical columns, two columns must share the same set of row separators. The different generated grid-tables exactly correspond to the context needed for data extraction components, where the first row includes labels, and the second row includes values.

Figure 5:
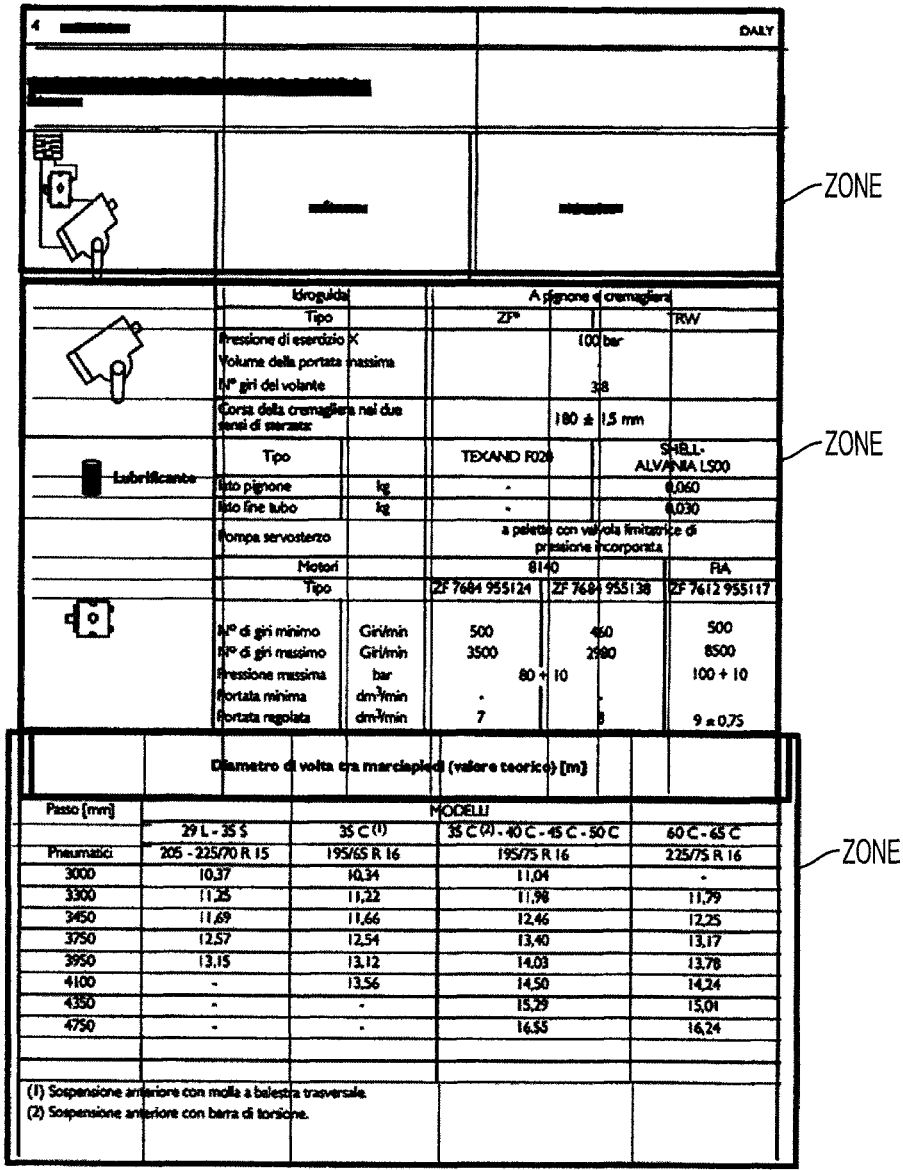
FIG. 5 is an example of a scanned document, where an exemplary method of generating a graphical organization identifies several overlapping grid-tables including a raw "Diametro di volta . . . " belonging to two grid-tables.

FIG. 5 is an example of a scanned document, where an exemplary method of generating a graphical organization identifies several overlapping grid-tables including a raw "Diametro di volta . . . " belonging to two grid-tables.

Regarding the issue of noise, especially important for other methods, especially for page images, is the availability of clean lines. For bad quality images or large skewed images, lines can be broken. Other known methods usually try to first build cells while tolerating some distances between each of the four lines delimiting the cell. In contrast, the method and system disclosed herein assumes the size of the lines to be identified are dimensional lines, i.e., equivalent to one or both of the vertical and horizontal dimension of the zone. Considering a given vertical or horizontal orientation o: for each o-oriented line in a zone, all other overlapping lines are added, where overlapping lines may be the result of artificially enlarging. If the resulting line has the dimensional size, i.e., zone height or zone width, it is considered a dimensional line.

As previously described, a primary parameter of the method, p, is used to compare the zone dimensions (h, w) with the line length. Other known methods usually use parameters which identify intersecting lines to delimit cells.

Figure 6A:
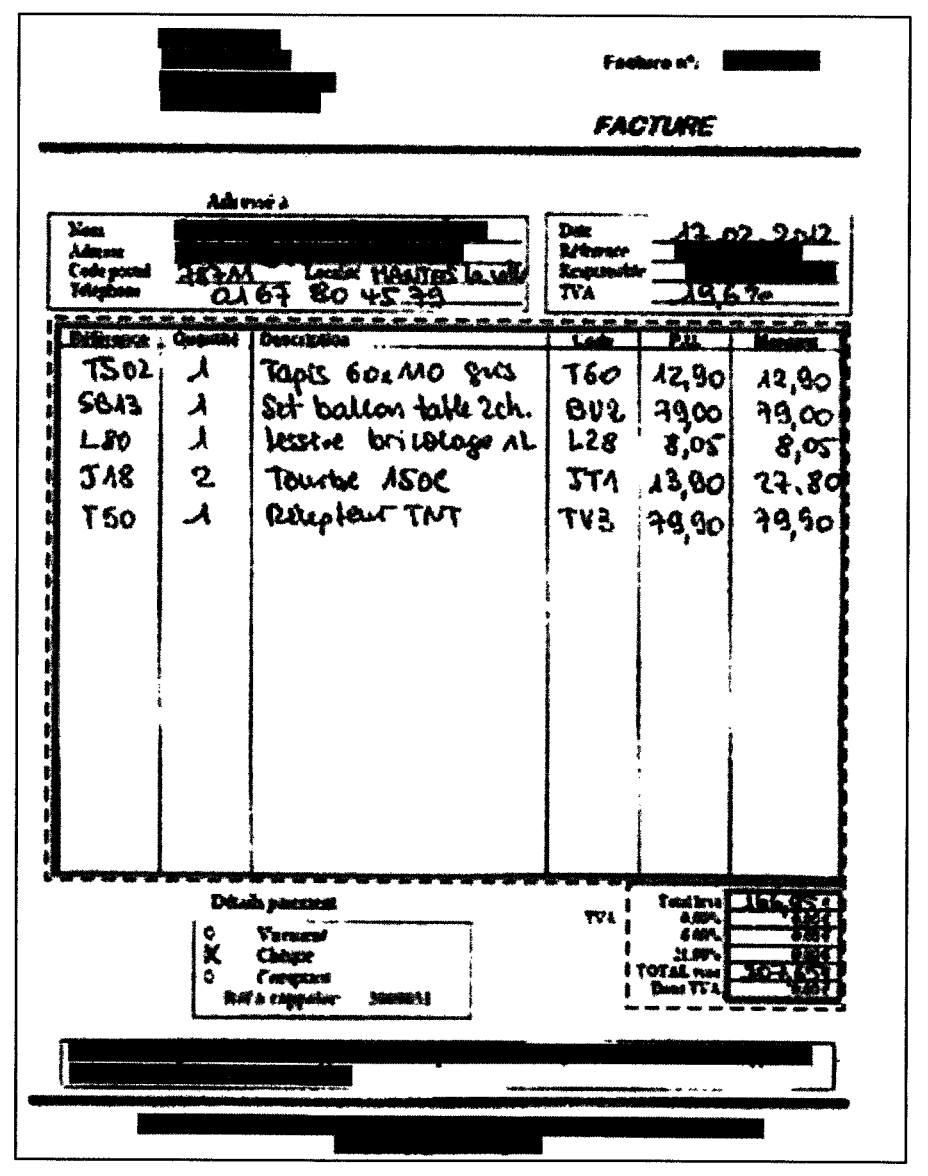
Figure 6B:
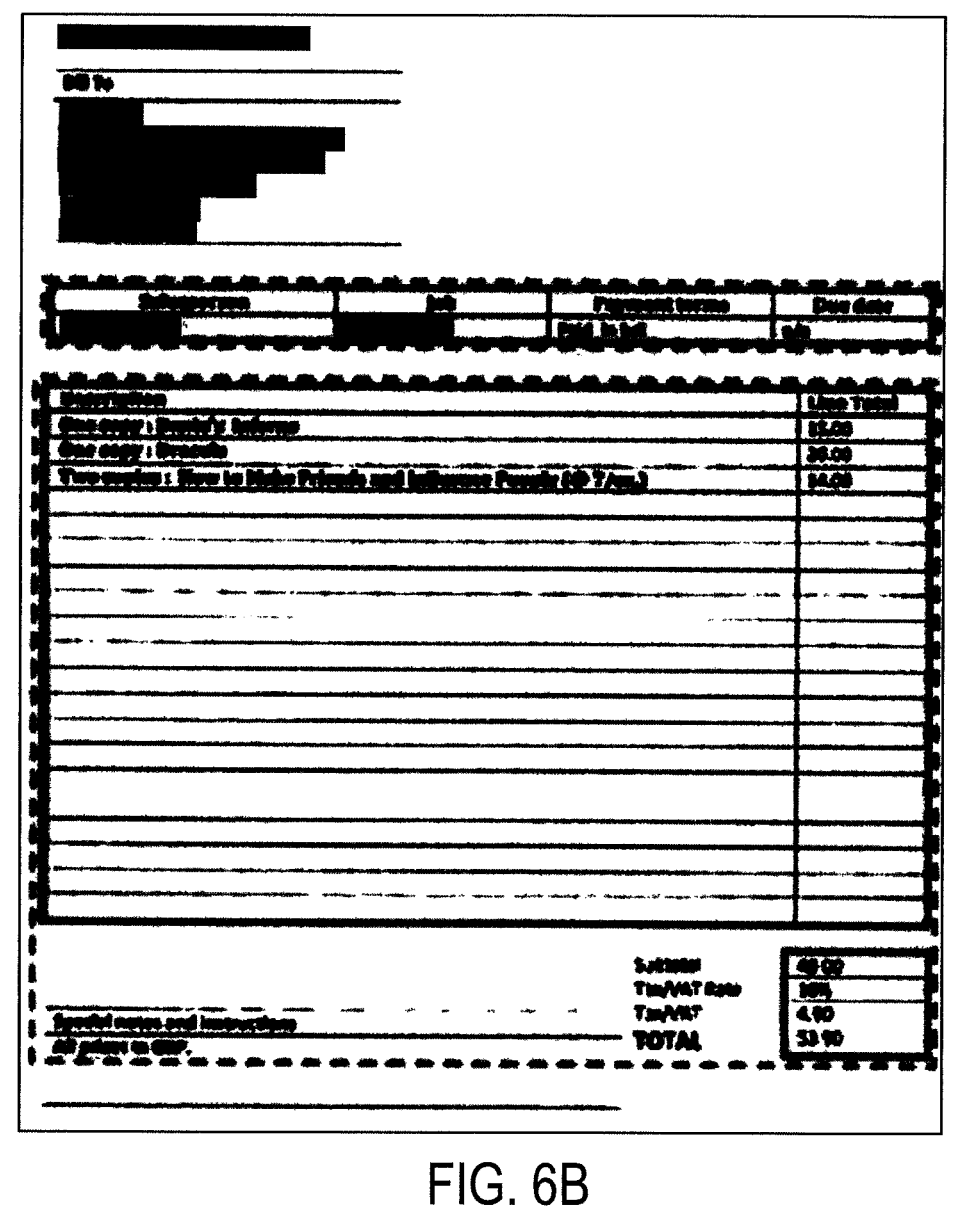

To illustrate the difficulty of 'groundtruthing', shown in FIG. 6A and FIG. 6B are pages from a dataset, with dotted lines manually annotating the ground truth and solid lines providing the results of the disclosed method and system. For an identical type of document (invoice), one annotator (FIG. 6A) considers the 'total' table as a separated table, including the labels (text) which are outside of the graphical table, which from a data extraction perspective makes sense. The second annotator (FIG. 6B) annotates a large table including the 'total' table as a separated table, including the labels (text) which are outside of the graphical table, which from a data extraction perspective makes sense. The second annotator (FIG. 6B) annotates a large table including the 'total table'. As shown, the disclosed algorithm is more consistent (solid lines).

Presented now are evaluations carried out for projects where the disclosed method and system was used. This evaluation is indirect since it evaluates the data extraction task, and shows the efficiency of the method for these projects/documents.

Architectural Plan Processing

The first set of documents included architectural plans on which technical specifications are described in tables called schedules. The schedules are fairly regular, where most are a grid-table with the first row completely spanned, and optionally the last row, i.e., footnotes, as well. 100 sheets were evaluated and the extraction method achieved around 90% accuracy, roughly 150 schedules to be extracted, and for each schedule the list of products and manufacturers. Errors were mostly due to OCR noise where text was completely missed. The extraction method heavily relies on the graphical component, where it recursively searches in the graphical zone tree for a grid-table having a specific form, mainly a first cell completely spanned and specific key word content.

Some difficulties with these plans include their huge size (66×24 inches or bigger), where the line extraction is challenging, and long lines can be often broken. In addition, schedules can occur inside other graphical zones, sheets can use graphical borders, more or less elaborated, and a recursive approach is required to find the schedule level. The schedule is most of the time a grid-table.

Invoice Processing

For this evaluation, a set of invoices was processed with and without the graphical component. The method used in U.S. patent application Ser. No. 14/475,809, filed Sep. 3, 2014, by Hervé Déjean et al., entitled "METHOD AND SYSTEM OF EXTRACTING LABEL:VALUE DATA FROM A DOCUMENT". For simplification, a F1 score is provided in the next table, but the variation is mainly due to the recall variation. The first two fields are less impacted since they often occur in a non-graphical zone, but nevertheless the impact of the graphical component is positive (+1 and +4).

| Field | F1 w/o graphical Zones | F1 with graphical Zones | Variation |
| --- | --- | --- | --- |
| Invoice number | 72 | 73 | +1 |
| Invoice date | 62 | 66 | +4 |
| Ship date | 50 | 65 | +15 |
| PO number | 68 | 70 | +2 |
| Account number | 58 | 58 | — |
| Invoice total | 88 | 90 | +2 |
| Invoice tax | 72 | 70 | −2 |
| Discount amount | 75 | 79 | +4 |

Figure 7:
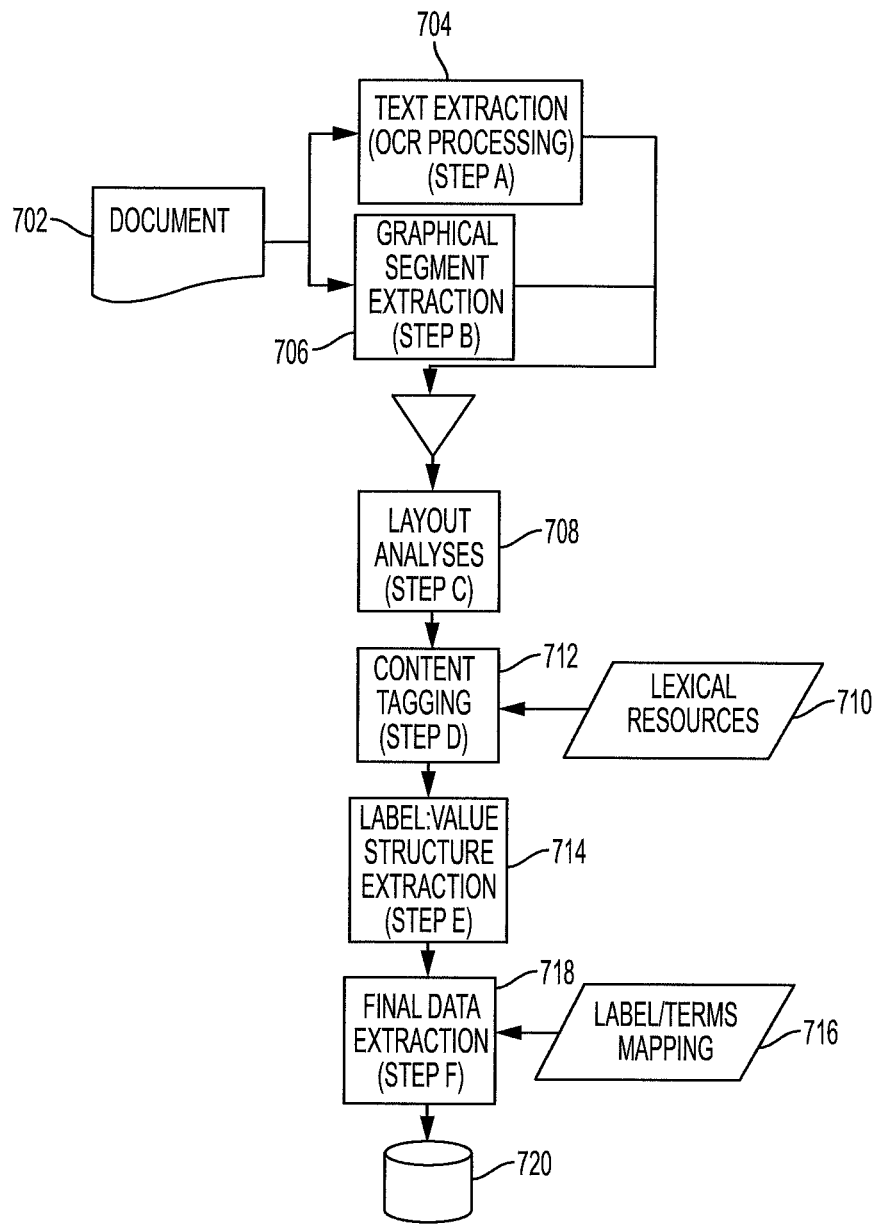
FIG. 7 is a flow chart of an exemplary embodiment of a method of extracting structured label and value pairwise data according to this disclosure.

FIG. 7 is a flow chart of an exemplary embodiment of a method of extracting structured label and value pairwise data according to this disclosure.

With reference to FIG. 7, described now are the steps of an exemplary method of extracting label:value pairwise data.

Step A) Text extraction 704: optical character recognition (OCR) for document image, text extraction through an Application Programming Interface (API) for a digital document 702 such as PDF.

Step B) Graphical segments extraction 706: image analysis for document image or extraction through an API for digital document 702.

Step C) Layout Analysis 708: several layout analyses are performed, using content and graphical lines.

Step D) Content tagging 712: content is tagged in order to identify labels and values occurrences. Lexical resources 710 provide a list of predefined terms used to tag label candidates.

Step E) Label:value structure extraction 714: using the sequence-based algorithm, all label:value structures are extracted.

Step F) Final information extraction 718: using a mapping table 716, extracted label:value data is associated with targeted data, i.e., data selected for extraction and stored on a data storage device 720.

Figure 8:
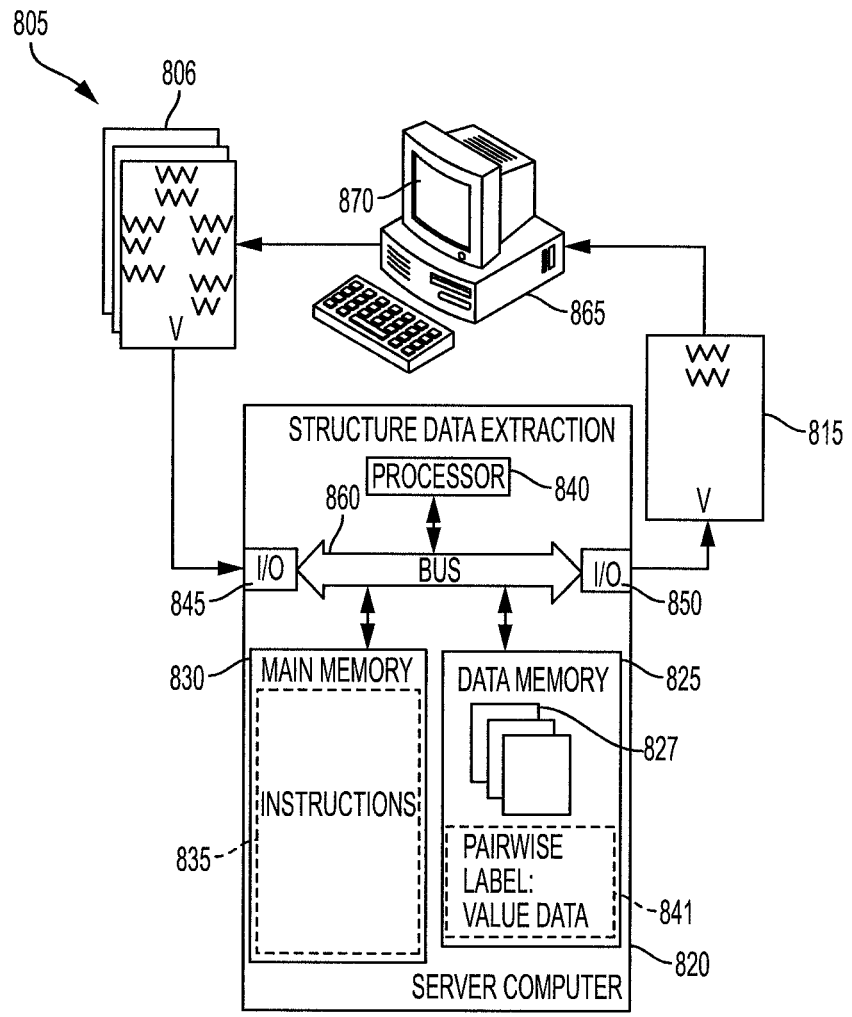
FIG. 8 is a functional block diagram of an exemplary embodiment of a document processing system which extracts structured label and value pairwise data according to this disclosure.

FIG. 8 is a functional block diagram of an exemplary embodiment of a document processing system which extracts structured label and value pairwise data according to this disclosure.

With reference to FIG. 8, illustrated is an exemplary system 805 extracting data from a document 806 according to the exemplary methods described herein. The system 805 takes as input a document 806 which includes one or more document pages, i.e., invoices. The system outputs 815 pairwise label: value data 841 extracted from the document 806 which have been identified on a document, i.e., form, and stored in data memory 825.

The exemplary system may include one or more specific or general purpose computing devices 820. The system receives, as input, document 806 and stores the document in data memory 825, as a digital representation 827 during processing. The document is received in electronic form and can be, for example, one or more invoices. The exemplary document is in a page description language, such as a PDF, Portable Document Format (ADOBE SYSTEMS®) file, although other unstructured documents are also contemplated, such as PostScript (ADOBE SYSTEMS®), PCL, Printer Command Language (HEWLETT-PACKARD®), such as PCL-5, PCL-5E, PCL-6, PCL-XL, TIFF, BMP, Word document, or the like. In PDF, for example, each page of a document set is assigned a set of elements, such as text elements and graphical elements, and their respective sizes and locations are identified in a job ticket. The exemplary document includes one or more pages, each of which may be processed independently by the system. The page(s) may each include text, images, or combinations thereof. Images can be photographs, graphics, etc.

Main memory 830 of the system 805 stores instructions 835 for performing the exemplary method. These instructions 835 are implemented by an associated processor 840, such as the computer's CPU. The computer communicates with external devices via one or more input/output devices 845, 850. The hardware components 825, 830, 840, 845, 850 are communicatively linked by a data/control bus 860.

While a collection of documents could be processed, rather than a single document, the exemplary method is also suited to processing documents singly. Prior to inputting, the document pages may be stored in any suitable tangible storage media such as a disk, ROM or RAM, or may be input into the system in the form of a carrier wave, e.g., via the Internet. The input device may include a modem link, a wired or wireless connection, USB port, floppy or hard disk receiver, or the like and may be separated or combined with other components of the system. While the illustrated source of the document is a client computing device 865, which may be similarly configured to computer 820, except as noted, it will be appreciated that the document may be input from a scanner, or other digital image capture device, with an associated Optical Character Recognition (OCR) engine for processing the output of the scanner to generate the pages of document, or from a disk, flash drive or other memory storage device.

The system may comprise one or more computing devices such as a personal computer, PDA, laptop computer, server computer, or combination thereof. Memories 825, 830 may be integral or separate and may represent any type of non-transitory computer readable medium such as random access memory (RAM), read only memory (ROM), magnetic disk or tape, optical disk, flash memory, or holographic memory. In one embodiment, the memories comprise a combination of random access memory and read only memory. In some embodiments, the processor and memory may be combined in a single chip.

The digital processor 840 can be variously embodied, such as by a single core processor, a dual core processor (or more generally by a multiple core processor), a digital processor and cooperating math coprocessor, a digital controller, or the like. The digital processor, in addition to controlling the operation of the computer, executes instructions stored in memory for performing the method outlined in FIG. 8, and others discussed herein.

The system may output the information, specifically, document image information, to an external computing device, such as device, or to another output device, such as a display device, such as a screen, or a hardcopy output device, such as a printer, or the like, or to a remote memory storage device. The source/output device may be connected directly with the system or linked thereto, e.g., via a wired or wireless link, such as a local area network or wide area network, such as the Internet. In some embodiments, the information output of the system is stored in memory for further processing, in which content of the document page is labeled or otherwise processed, using the identified structures as input information. The system may generate a graphical user interface (GUI) for display to a user. The exemplary GUI may enable a user to interact with the system via a display screen with a user input device, such as a cursor control device, keyboard, keypad, joystick, touchscreen, or the like. In one exemplary embodiment the display screen 870 is linked to the client computing device 865 and client device includes a web browser which allows the user to interact with the apparatus.

FIGS. 9A-9K illustrate an example of a series of steps included in an exemplary method of generating a graphical organization of a scanned invoice.

FIG. 9A illustrates an initial scan of an invoice to be processed.

FIG. 9B identifies an initial zone including the entire page.

Figure 9C:
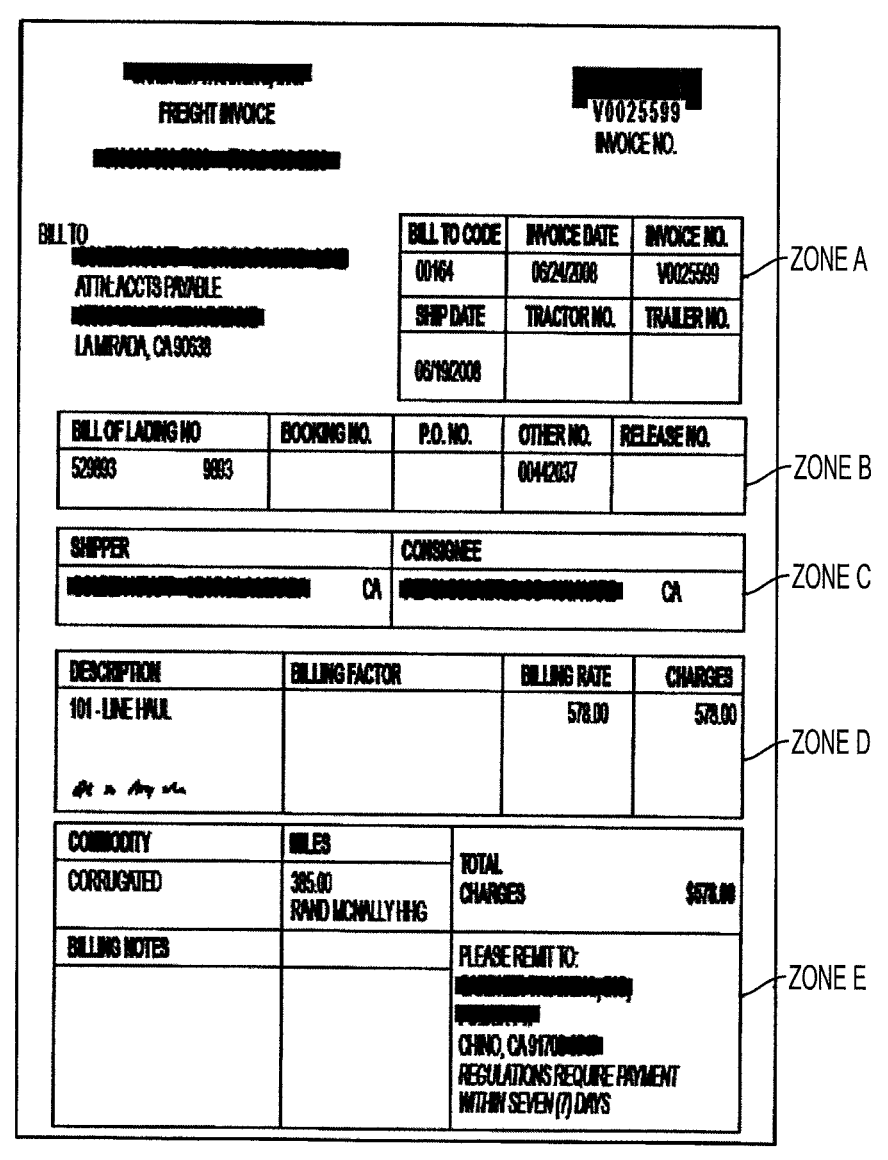

FIG. 9C illustrates where no dimensional elements are found for the initial zone and step 6 of the exemplary method creates five sub-zones.

Figure 9D:
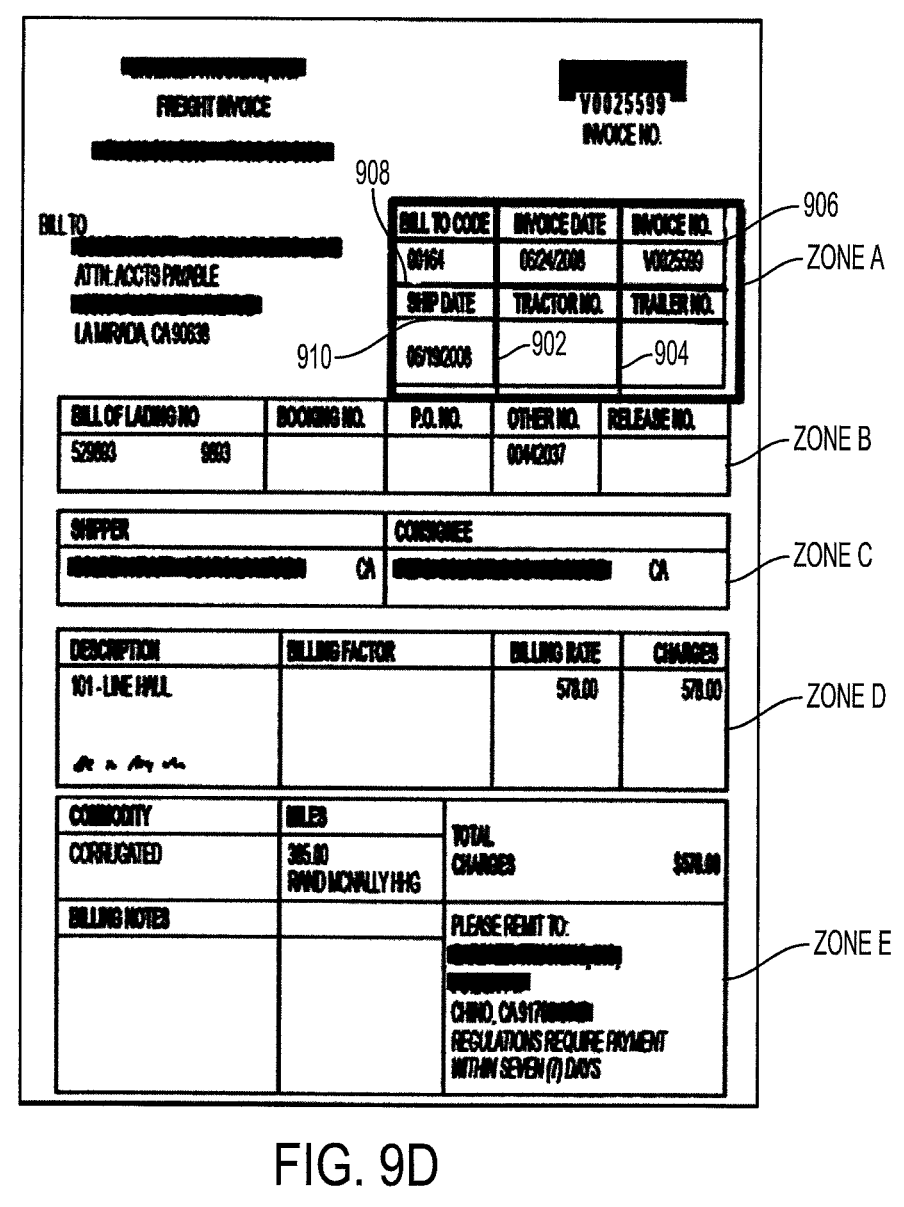

FIG. 9D illustrates the exemplary method of generating a graphical organization of a page for Zone A, where the method identifies two vertical dimensional elements 902 and 904, and three horizontal dimensional elements 906, 908 and 910 within Zone A and identifies a single grid table.

Figure 9E:
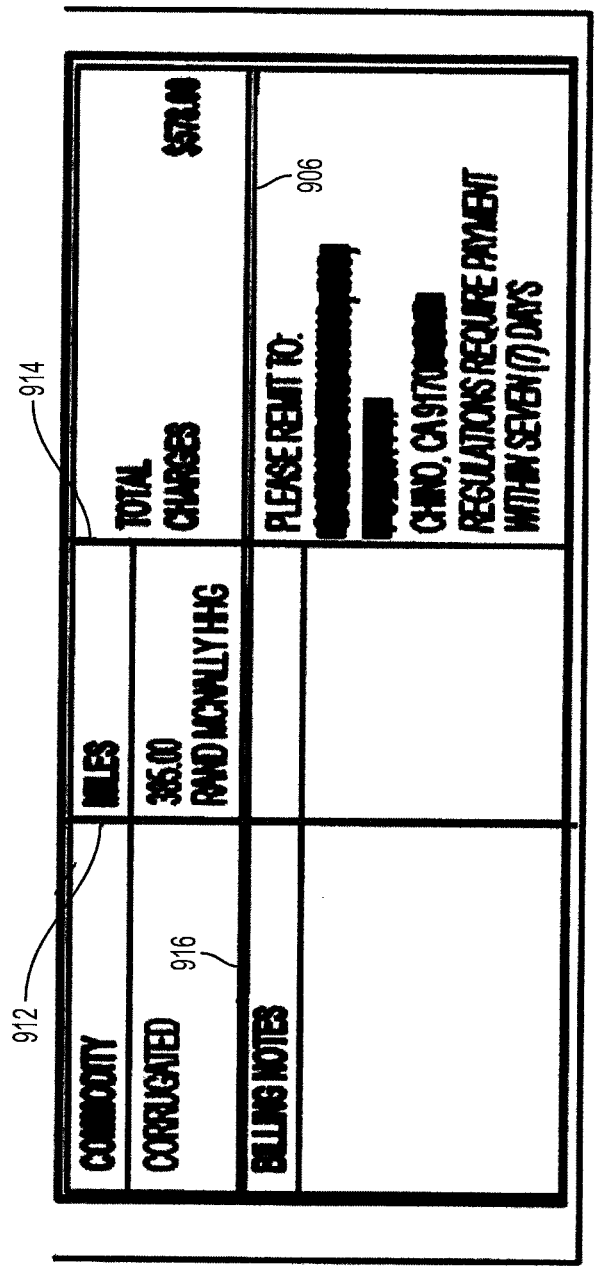

FIG. 9E illustrates the exemplary method of generating a graphical organization of a page for Zone E, where the method identifies two vertical dimensional elements 912 and 914, and one horizontal dimensional element 916.

FIG. 9F illustrates the exemplary method of generating a graphical organization of a page for Zone E, where two rows are generated using the one identified horizontal dimensional element 916.

FIG. 9G illustrates the exemplary method of generating a graphical organization of a page for Zone E, where three columns are generated using the two identified vertical dimensional elements 912 and 914.

Figure 9H:
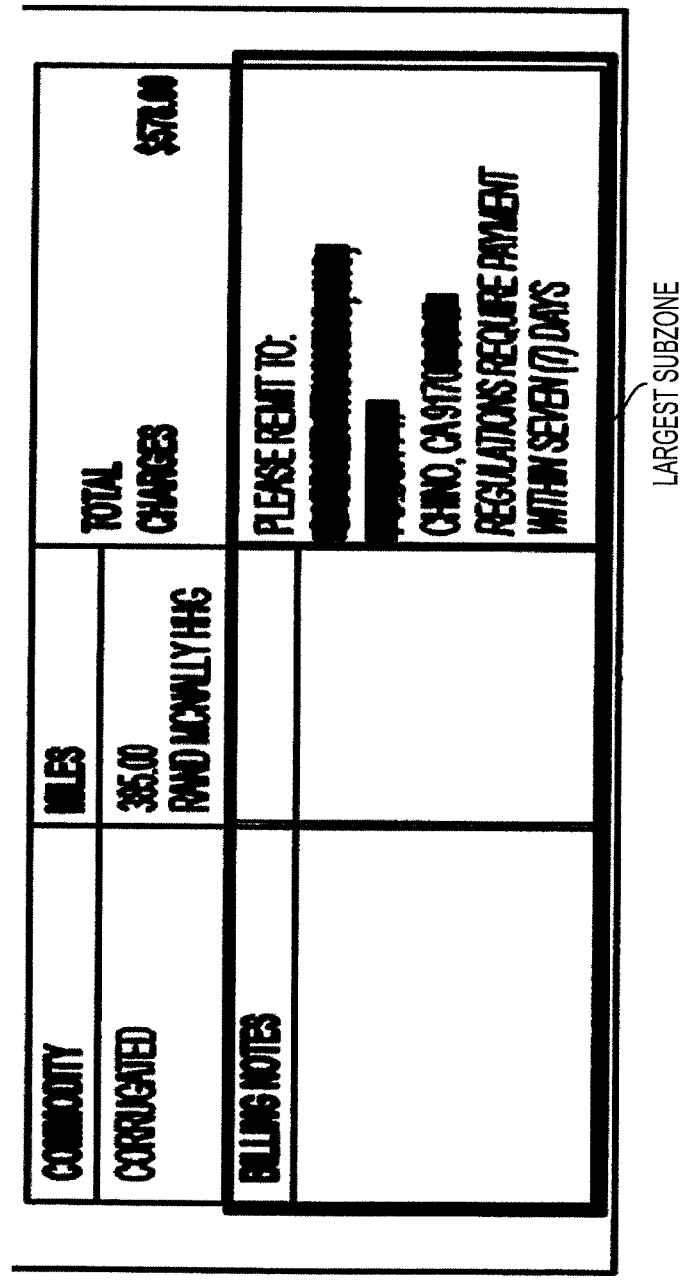
Figure 9I:
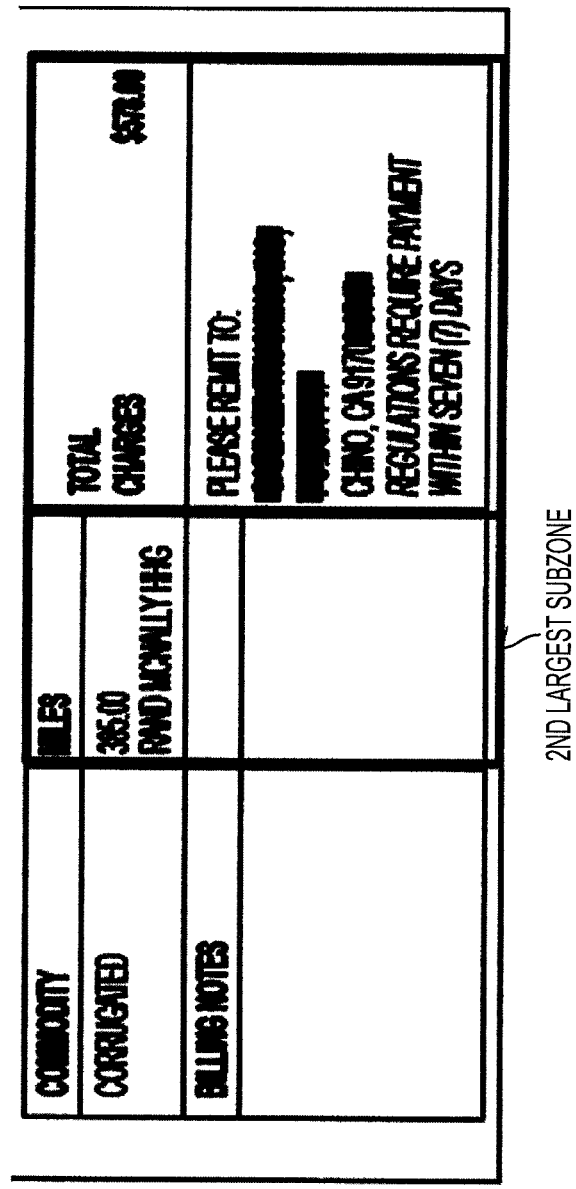

FIGS. 9H, 9I and 9J illustrate the exemplary method of generating a graphical organization of a page for Zone E, where the method generates three subzones and sorts them by size, FIG. 9H identifying the largest subzone, FIG. 9I identifying the second largest subzone, and FIG. 9J identifying the third largest subzone.

Figure 9K:
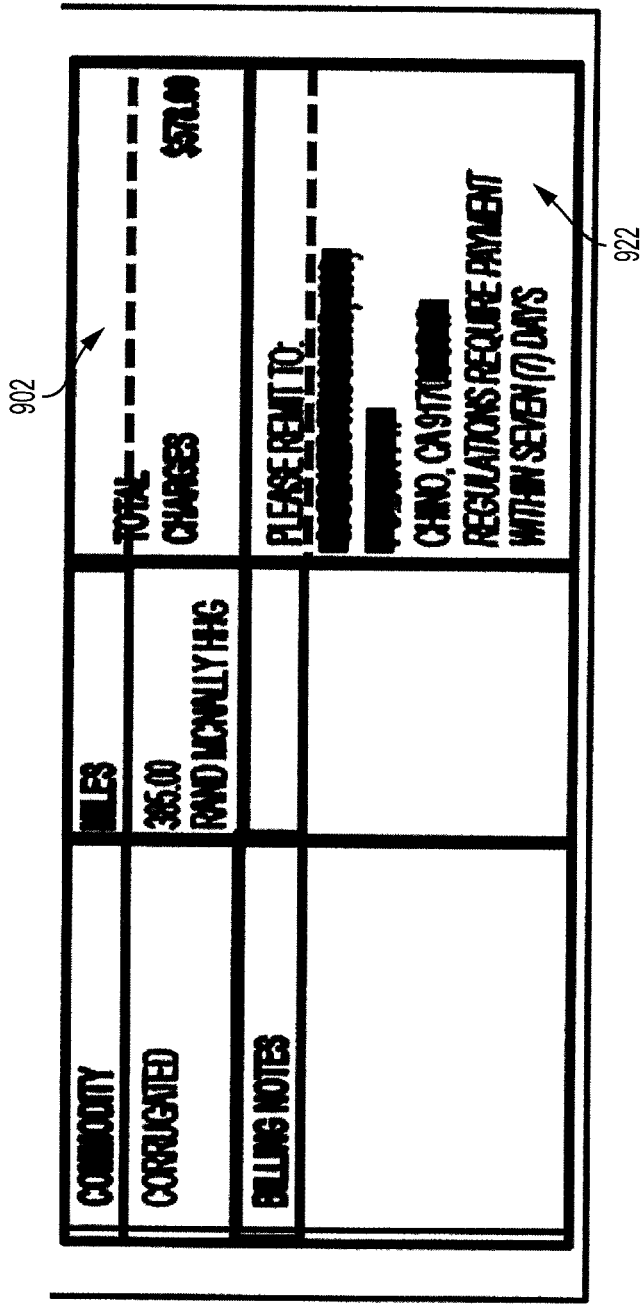

FIG. 9K illustrates the exemplary method of generating a graphical organization of a page for Zone E, where two cells 920 and 922 in the right-most column are tagged as row-spanned, indicated by dashed lines.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of generating a graphical organization of a digital version of a document page using a document processing system including a memory and a processor communicatively coupled to the memory for performing the method, the method comprising:
   a) the processor extracting a description of the digital version of the document page, the description including a length of the document page, a width of the document page, and one or more graphical line descriptions, the graphical line descriptions associated with a position and length of one or more graphical lines present in the document page;
   b) the processor generating an initial zone to cover a predetermined first area of the document page which is equal to or less than a total area of the page, the predetermined first area including an initial zone length and initial zone width;
   c) the processor determining if one or more dimensional graphical lines are within the initial zone, where the dimensional graphical lines are defined as graphical lines present in the initial zone where the graphical line length is substantially equivalent to the initial zone length or width;
   d) if the initial zone includes one or more dimensional graphical lines, the processor generating one or more grid-tables including the one or more dimensional graphical lines providing horizontal and/or vertical boundaries associated with cells of the generated grid-tables; and
   e) if the initial zone does not include one or more dimensional graphic lines,
      e1) the processor generating one or more subzones to cover an area within the initial zone, each subzone area including a subzone length and subzone width;
      e2) the processor determining if one or more subzone dimensional graphic lines are present within each subzone, where the subzone dimensional graphic lines are defined as graphic lines with line lengths substantially equivalent to the subzone length or width;
      e3) if the subzone includes one or more subzone dimensional graphic lines, the processor generating one or more subzone grid-tables including the one or more subzone dimensional graphic lines providing horizontal and/or vertical boundaries associated with cells of the generated subzone grid-tables;
   f) the processor generating attributes associated with the document page, the attributes including a list of generated zone descriptions and a list of respective grid-table descriptions.

2. The method of generating a graphical organization of a digital version of a document page according to claim 1, step d) comprising:
   d1) if the initial zone includes one or more dimensional graphical lines, the processor generating one or more grid-tables including the one or more dimensional graphical lines, the processor generating one or more grid-tables including the one or more dimensional graphical lines providing horizontal and/or vertical boundaries associated with cells of the generated grid-tables;
   d2) the processor generating one or more cell subzones within each cell of the grid-tables generated in step d1), the cell subzones including a cell subzone length and cell subzone width;
   d3) the processor determining if one or more dimensional graphical lines are within the cell subzones, where the dimensional graphical lines are defined as graphical lines present in the cell subzones where the graphical line length is substantially equivalent to the cell subzone length or width; and
   d4) if the cell subzones include one or more dimensional graphical lines, the processor generating one or more grid-tables including the one or more dimensional graphical lines providing horizontal and/or vertical boundaries associated with cells of the generated grid-tables.

3. The method of generating a graphical organization of a digital version of a document page according to claim 1, wherein step c) performs cropping of graphical lines present in the initial zone, which extend outside the initial zone.

4. The method of generating a graphical organization of a digital version of a document page according to claim 1, wherein step c) uses a threshold to determine if the graphical line length is substantially equivalent to the initial zone length or width.

5. The method of generating a graphical organization of a digital version of a document page according to claim 1, wherein step d) generates a minimum number of compatible grid-tables.

6. The method of generating a graphical organization of a digital version of a document page according to claim 5, wherein overlapping of the generated grid-tables is permitted, and one or more of the grid-tables include spanned and/or split cells.

7. The method of generating a graphical organization of a digital version of a document page according to claim 1, wherein steps e2) and e3) are sequentially performed for a plurality of subzones, starting with the subzone with a largest area and ending with the subzone with a smallest area.

8. The method of generating a graphical organization of a digital version of a document page according to claim 1, further comprising:
   g) processing the list of generated zone descriptions, list of respective grid-table descriptions and the document page to extract label and value pairwise data from the associated zones.

9. A computer program product comprising a non-transitory recording medium storing instructions for performing the method of claim 1, and a processor in communication with the memory which implements the instructions.

10. A system comprising memory storing instructions for performing the method of claim 1, and a processor in communication with the memory which implements the instructions.

11. A document processing system for generating a graphical organization of a digital version of a document page, the document processing system comprising:
   an extraction module configured to extract a description of the digital version of the document page, the description including a length of the document page, a width of the document page, and one or more graphical line descriptions, the graphical line descriptions associated with a position and length of one or more graphical lines present in the document page;

an initial zone generation module configured to generate an initial zone to cover a predetermined first area of the document page which is equal to or less than a total area of the page, the predetermined first area including an initial zone length and initial zone width;

a dimensional graphical line determination module configured to determine if one or more dimensional graphical lines are within the initial zone, where the dimensional graphical lines are defined as graphical lines present in the initial zone where the graphical line length is substantially equivalent to the initial zone length or width;

a grid-table generation module configured to generate one or more grid-tables if the initial zone includes one or more dimensional graphical lines, the one or more grid-tables including the one or more dimensional graphical lines providing horizontal and/or vertical boundaries associated with cells of the generated grid-tables;

a subzone generation module configured to generate one or more subzones if the initial zone does not include one or more dimensional lines by generating one or more subzones to cover an area within the initial zone, each subzone area including a subzone length and subzone width;

a subzone dimensional graphic line determination module configured to determine if one or more subzone dimensional graphic lines are present within each subzone, where the subzone dimensional graphic lines are defined as graphic lines with line lengths substantially equivalent to the subzone length or width;

a subzone grid-table generation module configured to generate one or more subzone grid-tables if the subzone includes one or more subzone dimensional graphic lines, the subzone grid-tables including the one or more subzone dimensional graphic lines providing horizontal and/or vertical boundaries associated with cells of the generated subzone grid-tables; and an attribute generation module configured to generate attributes associated with the document page, the attributes including a list of generated zone descriptions and a list of respective grid-table descriptions.

12. The document processing system according to claim 11, wherein the grid-table generation module is configured to:

generate one or more grid-tables if the initial zone includes one or more dimensional graphic lines, the one or more grid-tables including the one or more dimensional graphic lines providing horizontal and/or vertical boundaries associated with cells of the generated grid-table;

generate one or more cell subzones within each cell of the grid-tables generated, the cell subzones including a cell subzone length and cell subzone width;

determine if one or more dimensional graphical lines are within the cell subzones, where the dimensional graphic lines are defined as graphical lines present in the cell subzones where the graphical line length is substantially equivalent to the cell subzone length or width; and generate one or more grid-tables including the one or more dimensional graphical lines if the cell subzones include one or more dimensional graphic lines, the dimensional graphical lines providing horizontal and/or vertical boundaries associated with cells of the generated grid-table.

13. The document processing system according to claim 11, wherein the dimensional graphical line determination module is configured to perform cropping of graphical lines present in the initial zone, which extend outside of the initial zone.

14. The document processing system according to claim 11, wherein the dimensional graphical line determination module is configured to use a threshold to determine if the graphical line length is substantially equivalent to the initial zone length or width.

15. The document processing system according to claim 11, wherein the grid-table generation module is configured to generate a minimum number of compatible grid-tables.

16. The document processing system according to claim 15, wherein the grid-table generation module is configured to generate overlapping grid-tables and generate spanned and/or split cells.

17. The document processing system according to claim 11, further comprising:

a data extraction module configured to process the list of generated zone descriptions, list of respective grid-table descriptions and the document page to extract label and value pairwise data from the associated zones.

* * * * *